United States Patent
Bean et al.

(10) Patent No.: US 11,321,463 B2
(45) Date of Patent: May 3, 2022

(54) HARDWARE MALWARE PROFILING AND DETECTION SYSTEM

(71) Applicant: Rockwell Collins, Inc., Cedar Rapids, IA (US)

(72) Inventors: Reginald D. Bean, Center Point, IA (US); Carl J. Henning, Cedar Rapids, IA (US); Gregory S. Droba, Cedar Rapids, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 197 days.

(21) Appl. No.: 16/738,611

(22) Filed: Jan. 9, 2020

(65) Prior Publication Data
US 2021/0216632 A1 Jul. 15, 2021

(51) Int. Cl.
*G06F 21/56* (2013.01)
*G06F 21/57* (2013.01)

(52) U.S. Cl.
CPC ............ *G06F 21/566* (2013.01); *G06F 21/57* (2013.01); *G06F 2221/034* (2013.01)

(58) Field of Classification Search
CPC .. G06F 21/566; G06F 21/57; G06F 2221/034; G06F 21/552; G06F 21/554
See application file for complete search history.

(56) References Cited

U.S. PATENT DOCUMENTS

| 9,378,361 | B1* | 6/2016 | Yen ......................... G06F 21/55 |
| 10,409,980 | B2* | 9/2019 | Diehl ..................... H04L 41/145 |
| 10,701,096 | B1* | 6/2020 | Johnston ............. H04L 63/1425 |

(Continued)

FOREIGN PATENT DOCUMENTS

| CN | 104330721 B | 3/2017 |
| CN | 104215894 B | 4/2017 |

(Continued)

OTHER PUBLICATIONS

Cha, Byeongju et al., "Efficient Trojan Detection via Calibration of Process Variations", Proceedings of the Asian Test Symposium, 355-361, 10.1109/ATS.2012.64, https://ieeexplore.IEEE.org/document/6394229, Nov. 19, 2012, Abstract.

(Continued)

*Primary Examiner* — Christopher A Revak
(74) *Attorney, Agent, or Firm* — Suiter Swantz pc llo

(57) ABSTRACT

A hardware malware profiling and detection system is disclosed. In embodiments, the system includes a primary (e.g., trusted) system including template processors and hardware sensors. The template processors submit input vectors to the primary system and characterize the system response via power trace data collected by the hardware sensors. Based on the input vectors and power trace data, the template processors generate system templates and derive system challenges therefrom. The template processors submit the system challenges to a remote system under test and characterize the remote system response in real time via identical remote hardware sensors. The template processors correlate the real-time remote system response data with the system templates corresponding to the issued challenges to detect system anomalies or malware within the remote system or its components.

15 Claims, 3 Drawing Sheets

(56) References Cited

U.S. PATENT DOCUMENTS

2011/0304340 A1* 12/2011 Hall .................. H04B 3/46
324/533
2021/0203682 A1* 7/2021 Bajpai .................. H04L 67/12

FOREIGN PATENT DOCUMENTS

| | | |
|---|---|---|
| CN | 105117646 B | 6/2018 |
| CN | 109446848 A | 3/2019 |
| CN | 109543464 A | 3/2019 |

OTHER PUBLICATIONS

Fujimoto, Daisuke et al., "A Demonstration of a HT-Detection Method Based on Impedance Measurements of the Wiring Around ICs", IEEE Transactions on Circuits and Systems II: Express Briefs, vol. 65, Issue 10, https://ieeexplore.ieee.org/document/8418748, Jul. 24, 2018, Abstract.

* cited by examiner

HARDWARE MALWARE PROFILING AND DETECTION SYSTEM

CROSS-REFERENCE TO RELATED APPLICATIONS

The instant application is related to concurrently filed and commonly owned U.S. patent application Ser. No. 16/738,875. Said U.S. patent application Ser. No. 16/738,875 is hereby incorporated by reference in its entirety.

TECHNICAL FIELD

The subject matter disclosed herein is directed generally to remote system testing and more particularly to methods and apparatuses for detecting hardware malware in remote systems.

BACKGROUND

Leveraging commercial off-the-shelf (COTS) processing components (e.g., circuit boards) may result in the incorporation of third-party components that may be untrusted or have a low level of trust (e.g., the assurance that a system or its components executes only what is intended when it is intended). In particular, these untrusted components may include, or be vulnerable to, hardware Trojans or other malware; such malware may, in turn, lead to unintended or malicious operations, e.g., exfiltration of sensitive data. For example, a military platform utilizing untrusted hardware for COTS-based processing may jeopardize the integrity of mission-critical systems by introducing hardware malware. A network-accessible COTS platform may provide a "back door" into the system allowing not only the observation of processing functions, but the extraction and exfiltration of sensitive information therefrom by untrusted third parties and, consequently, the compromise of the system and any sensitive information traveling therethrough.

SUMMARY

A hardware malware detection apparatus is disclosed. In embodiments, the hardware malware detection apparatus includes template processors coupled to a primary (e.g., trusted) system by a set of hardware sensors. The hardware sensors collect primary power trace data generated by processing components of the primary system in response to test commands, command sequences, and other input vectors. The template processors generate system templates based on these input vectors and the corresponding primary power trace data. Remote systems in communication with the template processors include sets of hardware sensors identical to those of the primary system. In response to commands, command sequences, or other system challenges issued to the remote systems, the remote hardware sensors collect real-time remote power trace data. The template processors correlate this remote power trace data with the system templates to determine the presence or absence of system anomalies within the remote systems, e.g., whether the remote systems are performing as expected in response to specific challenges.

A method for detecting hardware malware is also disclosed. In embodiments, the method includes submitting input vectors to a primary (e.g., trusted) system via template processors in communication with the primary system. The method includes collecting primary power trace data via primary hardware sensors coupled to the primary system, the primary power trace data generated by the primary system in response to the one or more input vectors. The method includes generating, via the template processors, one or more system templates (e.g., characterizing how the primary system should perform based on the set of input vectors) based on the input vectors and the corresponding power trace data from the primary system. The method includes collecting real-time power trace data from identical sets of hardware sensors connected to remote (e.g., untrusted) systems, the real-time power trace data generated by the remote systems in response to system challenges submitted to the remote systems. The template processors correlate the real-time power trace data to the system templates to identify the presence or absence of malware or system anomalies within the remote systems based on the expected or intended performance of the remote systems as reflected by the system templates.

This Summary is provided solely as an introduction to subject matter that is fully described in the Detailed Description and Drawings. The Summary should not be considered to describe essential features nor be used to determine the scope of the Claims. Moreover, it is to be understood that both the foregoing Summary and the following Detailed Description are example and explanatory only and are not necessarily restrictive of the subject matter claimed.

BRIEF DESCRIPTION OF THE DRAWINGS

The detailed description is described with reference to the accompanying figures. The use of the same reference numbers in different instances in the description and the figures may indicate similar or identical items. Various embodiments or examples ("examples") of the present disclosure are disclosed in the following detailed description and the accompanying drawings. The drawings are not necessarily to scale. In general, operations of disclosed processes may be performed in an arbitrary order, unless otherwise provided in the claims. In the drawings:

DETAILED DESCRIPTION

Figure 1:
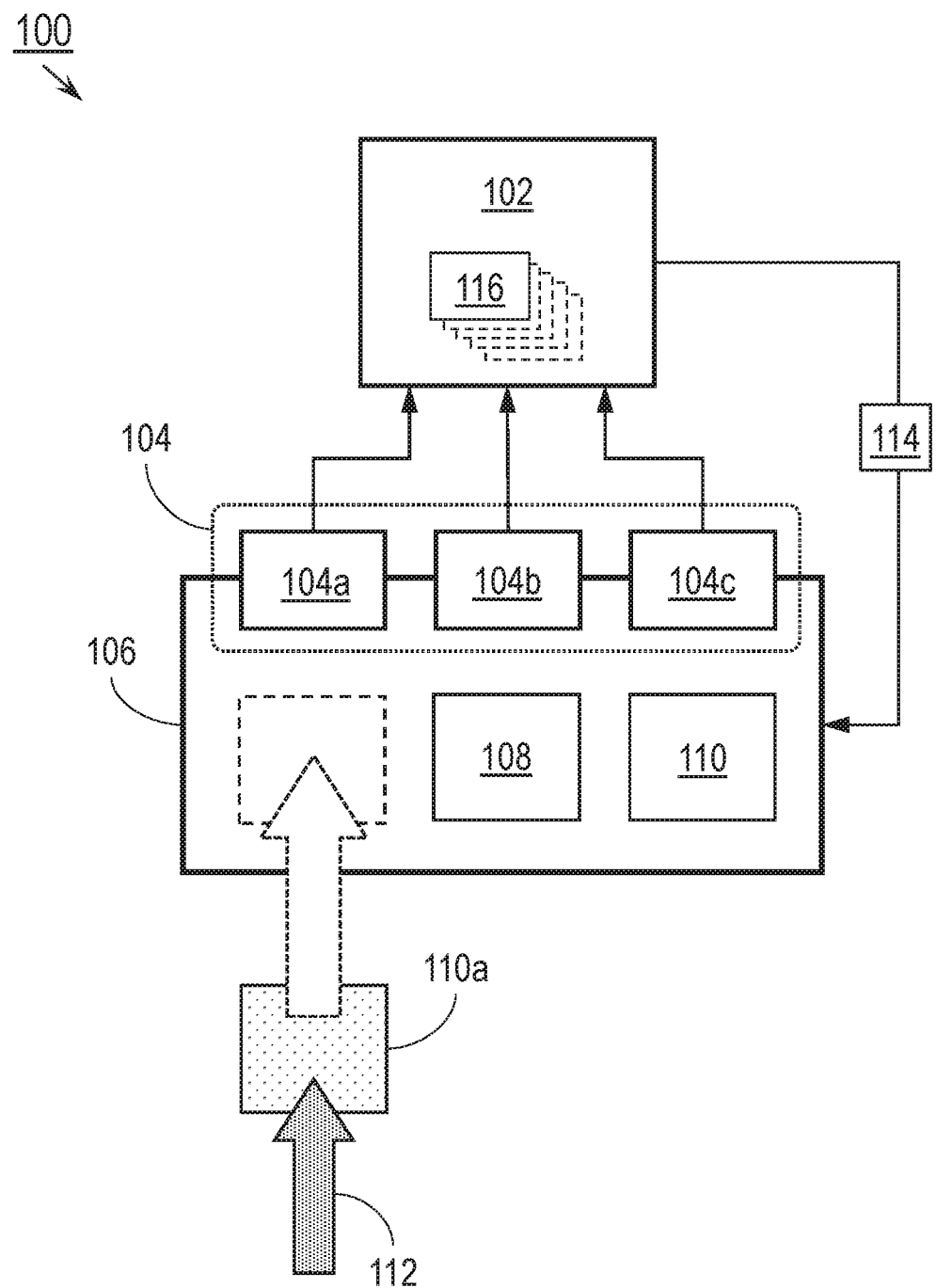
FIG. 1 is a block diagram illustrating a hardware malware detection apparatus in accordance with example embodiments of this disclosure.

Before explaining one or more embodiments of the disclosure in detail, it is to be understood that the embodiments are not limited in their application to the details of construction and the arrangement of the components or steps or methodologies set forth in the following description or illustrated in the drawings. In the following detailed description of embodiments, numerous specific details may be set forth in order to provide a more thorough understanding of the disclosure. However, it will be apparent to one of ordinary skill in the art having the benefit of the instant disclosure that the embodiments disclosed herein may be practiced without some of these specific details. In other instances, well-known features may not be described in detail to avoid unnecessarily complicating the instant disclosure.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only and should not be construed to limit the disclosure in any way unless expressly stated to the contrary.

Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of "a" or "an" may be employed to describe elements and components of embodiments disclosed herein. This is done merely for convenience and "a" and "an" are intended to include "one" or "at least one," and the singular also includes the plural unless it is obvious that it is meant otherwise.

Finally, as used herein any reference to "one embodiment" or "some embodiments" means that a particular element, feature, structure, or characteristic described in connection with the embodiment is included in at least one embodiment disclosed herein. The appearances of the phrase "in some embodiments" in various places in the specification are not necessarily all referring to the same embodiment, and embodiments may include one or more of the features expressly described or inherently present herein, or any combination or sub-combination of two or more such features, along with any other features which may not necessarily be expressly described or inherently present in the instant disclosure.

Referring to FIG. 1, a hardware malware detection apparatus 100 is disclosed. The apparatus 100 may include template processors 102, hardware sensors 104, and a remote system 106 (e.g., system under test, monitored system) including, e.g., remote processors 108 and/or remote hardware components 110 (e.g., circuit boards, network interfaces).

In embodiments, the remote system 106 may include untrusted components 110a compromised by, or otherwise vulnerable to, hardware malware 112. The presence of hardware malware 112 within untrusted components 110a of the remote system 106 may lead to unintended or untrusted behavior on the part of the remote system. Accordingly, the template processors 102 may determine the presence of hardware malware 112 within the remote system 106 (e.g., within its remote processors 108 or remote hardware components 110, including untrusted components 110a) by analyzing, via the hardware sensors 104, whether the remote system 106 is operating as intended.

In embodiments, the hardware sensors 104 may incorporate any combination of side-channel electromagnetic (EM) emanation sensors 104a, side-channel magnetic current imagery (MCI) sensors 104b, time-domain reflectometry (TDR) probes 104c, or any similarly appropriate sensors for characterizing a response of the remote system 106 to input vectors 114 submitted by the template processors 102. For example, input vectors 114 may include unique stimuli designed to elicit a particular response from the remote system 106. When an input vector 114 is submitted to the remote system 106, the resulting EM emanations data (captured by the side-channel EM emanation sensors 104a), MCI data (captured by the side-channel MCI sensors 104b), TDR data (captured by the TDR probes 104c), and/or other like power trace data may characterize a unique response specific to both the remote system 106 and to the particular input vector/s submitted. Accordingly, the template processors 102 may generate system templates 116 based on an input vector 114 or set thereof along with the corresponding system response data collected by the hardware sensors 104 when the input vector was submitted to the remote system 106.

In embodiments, if the remote system 106 is a trusted system, the collection of system templates 116 may characterize the trusted, or intended, operation of the remote system 106, e.g., how the remote system 106 and its components (e.g., remote processors 108, remote hardware components 110) should be expected to respond under the conditions presented by a given set of input vectors 114.

Figure 2:
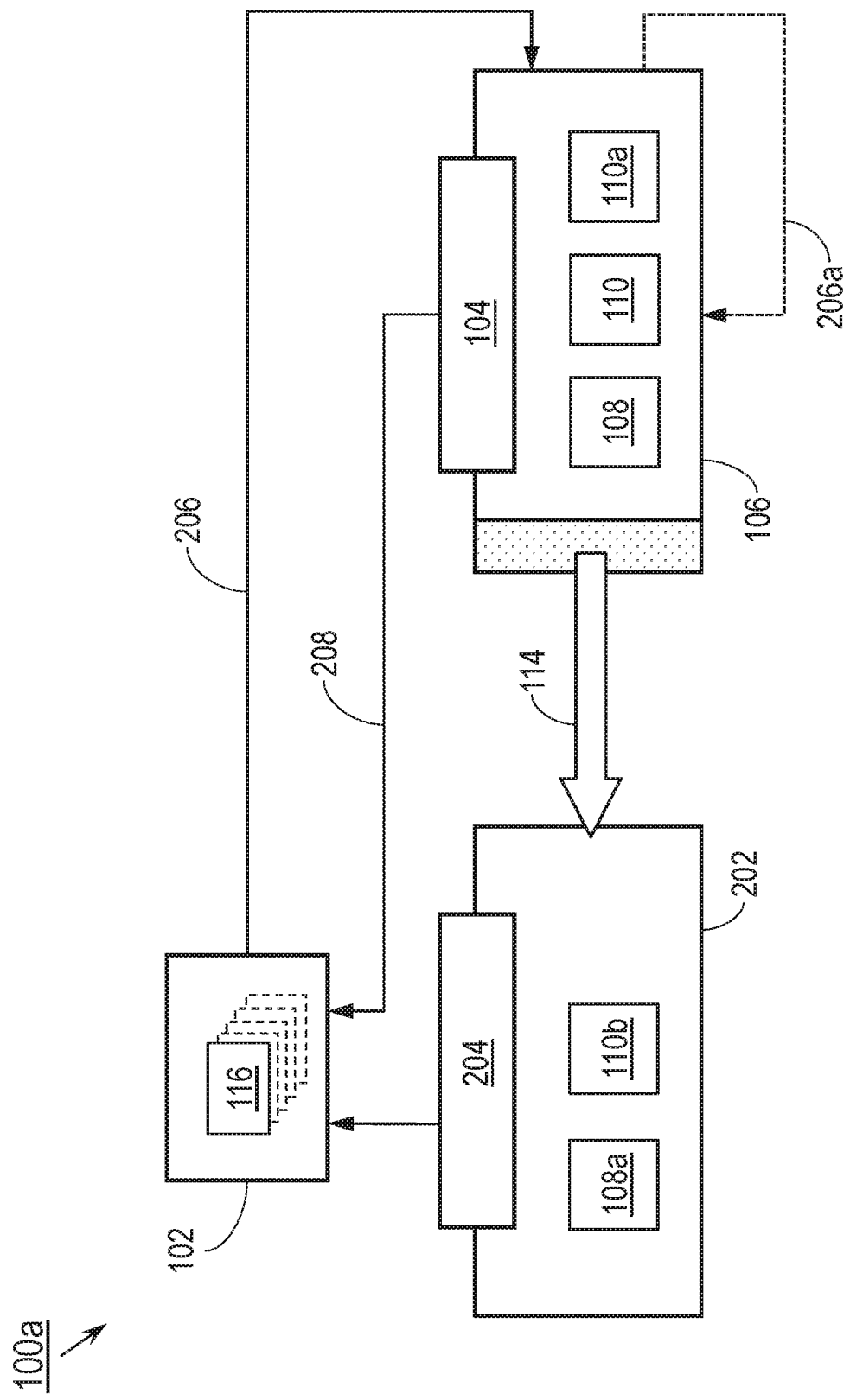
FIG. 2 is a block diagram illustrating the apparatus of FIG. 1.

Referring to FIG. 2, the hardware malware detection apparatus 100a may be implemented and may function similarly to the hardware malware detection apparatus 100 of FIG. 1, except that the hardware malware detection apparatus 100a may incorporate a trusted system 202 and a remote system 106 (e.g., monitored system, system under test).

In embodiments, the trusted system 202 and the remote system 106 may share hardware-based and software-based similarities (e.g., with respect to the component processors 108a, 108 (FIG. 1) (and/or software applications or operating systems configured to execute thereon) and/or the hardware components 110b, 110 (FIG. 1) of, respectively, the trusted system 202 and the remote system 106. Based on these similarities, if the remote system 106 is itself trusted or uncontaminated by hardware-based Trojans or other like malware (112, FIG. 1) the remote system should then operate or behave identically to the trusted system, given any set of input vectors 114 or other stimuli.

In embodiments, the trusted system 202 may collect input vectors 114 from the remote system 106. Based on the received set of input vectors 114, the template processors 102 may collect, via the hardware sensors 204 of the trusted system 202 (e.g., identical to the hardware sensors 104 of the remote system 106), power trace data (e.g., side channel/TDR data, sensor response data) responsive to the input vectors. The input vectors 114 and corresponding power trace data may be compiled by the template processors 102 into system templates 116. The system templates 116 may include or characterize the expected or intended behavior of the trusted system 202 and its components (e.g., its component processors 108a and hardware components 110b) based on the specific set of input vectors 114.

In embodiments, the template processors 102 may test the remote system 106 based on the generated system templates 116. The template processors 102 may incorporate a method similar to that of the template attack, but inverted. For example, the template processors 102 may generate challenges 206 based on, e.g., keys derivable or discoverable via the generated set of system templates 116. The template processors 102 may, in real time, issue the generated challenges 206 to the remote system 106 and collect real-time sensor response data 208 from the hardware sensors 104 of the remote system. In some embodiments, the remote system 106 may itself generate and/or issue commands, command sequences, and other challenges (206a), and the template processors 102 may monitor the real-time sensor response data 208 generated in response to the challenges 206a.

In embodiments, the template processors 102 may use multivariate distribution and other like techniques to correlate the real-time sensor response data 208 received from the remote system 106 in response to the challenges 206, 206a (e.g., via the hardware sensors 104) back to the corresponding system templates 116 from which the challenges were derived. For example, the template processors 102 may perform real-time analysis by applying the corresponding system templates 116 to the received real-time sensor response data 208 and verifying that the resulting templated response data fulfills the challenges 206, 206a that triggered the real-time sensor response data. If, for example, the received real-time sensor response data 208 substantially matches or fits the corresponding system templates 116, the template processors 102 may verify that the remote system 106 is also a trusted system. However, discorrelations or deviations of the received real-time sensor response data 208 from the system templates 116 may indicate a system anomaly within the remote system 106, its component processors 108, or its hardware components 110 (e.g., including untrusted hardware components 110a). For example, the system templates 116 may incorporate or provide for intended or expected behaviors on the part of the component processors 108 or hardware components 110. If the sensor response data received via the hardware sensors 104 indicates an absence of these intended behaviors, or indicates other unintended behaviors on the part of the component processors 108 or hardware components 110, the template processors 102 may indicate the presence of a system anomaly in the appropriate processor or hardware component. For example, the template processors 102 may identify a local failure of the hardware component 110, a hardware malware element (112, FIG. 1) present within one or more hardware components, or a software error associated with an application or operating system executing on the component processors 108.

Figure 3:
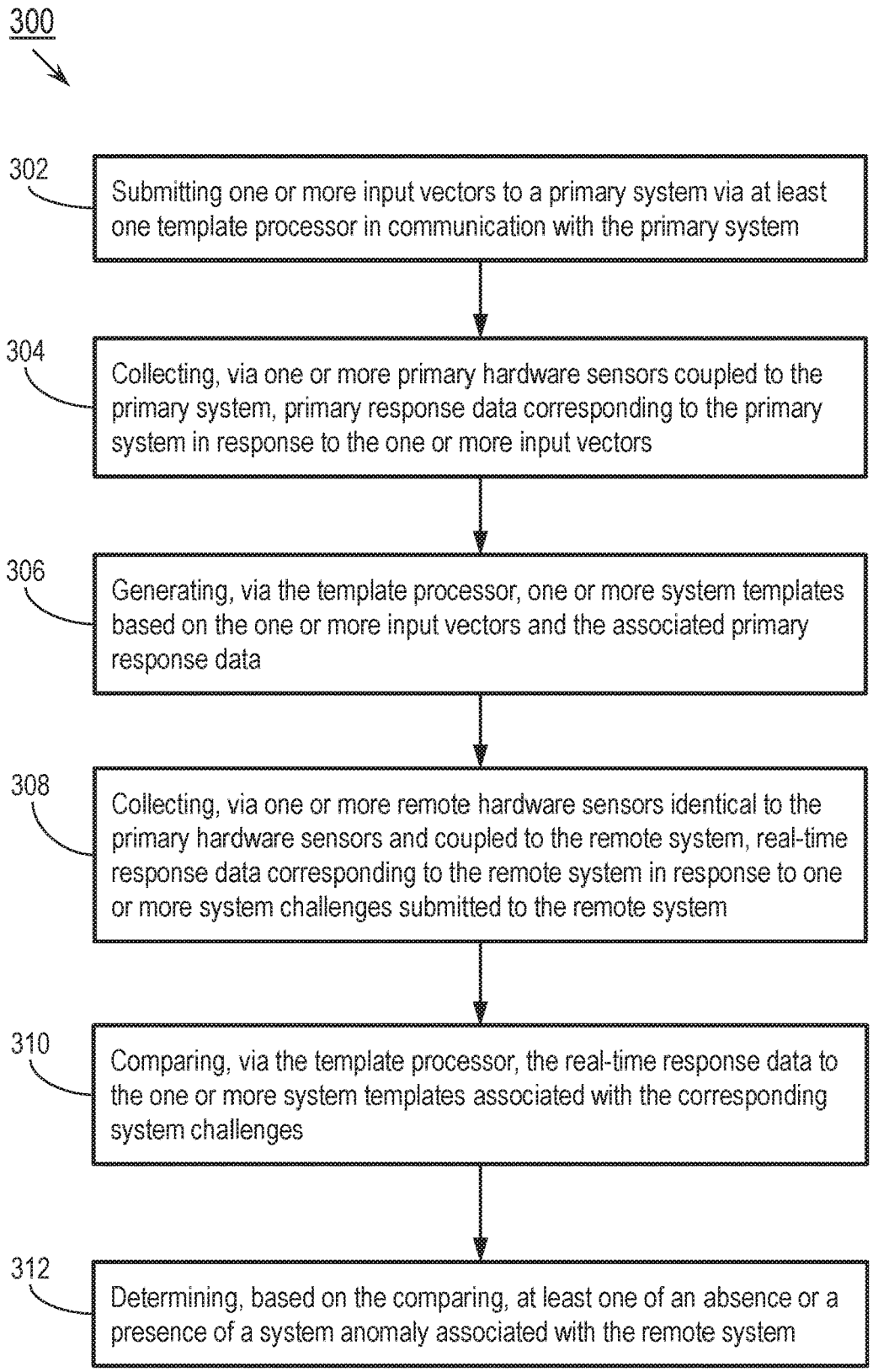
FIG. 3 is a flow diagram illustrating a method for detecting hardware malware in accordance with example embodiments of this disclosure.

Referring to FIG. 3, a method 300 may be implemented by the hardware malware detection apparatus 100/100a of FIGS. 1 and 2, and may include the following steps.

At a step 302, the template processors submit sets of input vectors to a primary system. The template processors may receive the input vectors from a remote system to be tested. In some embodiments, the template processors verify that the primary system is a trusted system.

At a step 304, the hardware sensors of the primary system record primary sensor response data generated in response to the submitted input vectors.

At a step 306, the template processors generate system templates based on the submitted input vectors and the corresponding primary sensor response data recorded by the hardware sensors.

At a step 308, remote hardware sensors (identical to the primary hardware sensors of the primary system) collect real-time response data from the remote system in response to submitted system challenges. For example, the remote hardware sensors (and corresponding primary hardware sensors) may include side-channel electromagnetic (EM) emanation sensors, side-channel magnetic current imagers (MCI), and time-domain reflectometry (TDR) probes. In some embodiments, the system challenges are generated by the template processors based on the system templates and issued to the remote system. In some embodiments, the system challenges include commands or command sequences generated within the remote system.

At a step 310, the template processors compare the real-time response data from the remote system to the corresponding system templates from which the submitted system challenges were derived.

At a step 312, the template processors determine the absence or presence of system anomalies within the remote system based on the comparison of the real-time response data to the system templates. For example, the template processors may identify a local failure of a hardware component of the remote system, a hardware malware element present within the remote system, or a software error associated with code executing on component processors of the remote system. In some embodiments, the template processors may verify the remote system as a trusted system.

It is to be understood that embodiments of the methods disclosed herein may include one or more of the steps described herein. Further, such steps may be carried out in any desired order and two or more of the steps may be carried out simultaneously with one another. Two or more of the steps disclosed herein may be combined in a single step, and in some embodiments, one or more of the steps may be carried out as two or more sub-steps. Further, other steps or sub-steps may be carried in addition to, or as substitutes to one or more of the steps disclosed herein.

Although inventive concepts have been described with reference to the embodiments illustrated in the attached drawing figures, equivalents may be employed and substitutions made herein without departing from the scope of the claims. Components illustrated and described herein are merely examples of a system/device and components that may be used to implement embodiments of the inventive concepts and may be replaced with other devices and components without departing from the scope of the claims. Furthermore, any dimensions, degrees, and/or numerical ranges provided herein are to be understood as non-limiting examples unless otherwise specified in the claims.

We claim:

1. A hardware malware detection apparatus, comprising:
   at least one template processor;
   a primary system including one or more primary processing components, the primary system communicatively coupled to the template processor by a plurality of primary hardware sensors, the primary hardware sensors configured to collect primary sensor response data generated by the primary processing components in response to one or more input vectors;
   at least one remote system including one or more remote processing components, the remote system communicatively coupled to the template processor by a plurality of remote hardware sensors identical to the plurality of primary hardware sensors, the remote hardware sensors configured to collect real-time sensor response data generated by the remote processing components in response to one or more challenges;
   the at least one template processor configured to:
      submit the one or more input vectors to the primary system;
      receive the primary sensor response data from the plurality of primary hardware sensors;
      generate one or more system templates based on the one or more input vectors and the associated primary sensor response data;
      generate the one or more challenges based on the one or more system templates;
      receive the real-time sensor response data from the plurality of secondary hardware sensors;
      compare the received real-time sensor response data to the one or more system templates associated with the corresponding challenges;
      and
   based on the comparing, identify a presence or an absence of at least one system anomaly corresponding to the remote system,
      wherein the plurality of primary hardware sensors and the plurality of remote hardware sensors include at least one of:
         a side-channel electromagnetic (EM) emanation sensor;

a side-channel magnetic current imager;
or
a time-domain reflectometry (TDR) probe.

2. The hardware malware detection apparatus of claim 1, wherein:
the primary system is a trusted system;
and
the at least one remote system includes at least one untrusted system.

3. The hardware malware detection apparatus of claim 2, wherein the template processor is configured to, based on the comparing, verify the remote system as a trusted system.

4. The hardware malware detection apparatus of claim 2, wherein the template processor is configured to verify the primary system as a trusted system.

5. The hardware malware detection apparatus of claim 1, wherein the template processor is configured to receive the one or more input vectors from the remote processor.

6. The hardware malware detection apparatus of claim 1, wherein said comparing the real-time sensor response data to the one or more system templates associated with the corresponding challenges is performed using one or more multivariate distribution techniques.

7. The hardware malware detection apparatus of claim 1, wherein the at least one template processor is configured to issue the one or more challenges to the remote system.

8. The hardware malware detection apparatus of claim 1, wherein:
the primary processing component includes at least one of a primary processor and a primary hardware component;
and
the remote processing component includes at least one of a remote processor and a remote hardware component.

9. A method for detecting hardware malware, the method comprising:
submitting one or more input vectors to a primary system via at least one template processor in communication with the primary system;
collecting, via one or more primary hardware sensors coupled to the primary system, primary response data corresponding to the primary system in response to the one or more input vectors, the one or more primary hardware sensors comprising at least one of a side-channel electromagnetic (EM) emanation sensor, a side-channel magnetic current imager, or a time-domain reflectometry (TDR) probe;
generating, via the template processor, one or more system templates based on the one or more input vectors and the associated primary response data;
collecting, via one or more remote hardware sensors identical to the primary hardware sensors and coupled to the remote system, real-time response data corresponding to the remote system in response to one or more system challenges submitted to the remote system;
comparing, via the template processor, the real-time response data to the one or more system templates associated with the corresponding system challenges;
and
determining, based on the comparing, at least one of an absence or a presence of a system anomaly associated with the remote system.

10. The method of claim 9, wherein submitting one or more input vectors to a primary system via at least one template processor in communication with a primary system includes:
receiving the one or more input vectors from the remote system.

11. The method of claim 9, wherein submitting one or more input vectors to a primary system via at least one template processor in communication with a primary system includes:
verifying, via the template processor, the primary system as a trusted system.

12. The method of claim 9, wherein determining, based on the comparing, at least one of an absence or a presence of a system anomaly associated with the remote system includes:
verifying, via the template processor, the remote system as a trusted system.

13. The method of claim 9, wherein determining, based on the comparing, at least one of an absence or a presence of a system anomaly associated with the remote system includes:
identifying at least one of a local component failure, a malware element, or a software error associated with the remote system.

14. The method of claim 9, wherein said comparing, via the template processor, the real-time response data to the one or more system templates associated with the corresponding system challenges includes:
using one or more multivariate distribution techniques.

15. The method of claim 9, wherein collecting, via one or more remote hardware sensors identical to the primary hardware sensors and coupled to the remote system, real-time response data corresponding to the remote system in response to one or more system challenges submitted to the remote system includes:
generating, via the template processor, the one or more system challenges based on the system templates;
and
submitting the one or more system challenges to the remote system via the template processor.

* * * * *